(No Model.) 4 Sheets—Sheet 1.
H. J. CASE.
SPRING TOOTH HARROW.
No. 604,854. Patented May 31, 1898.
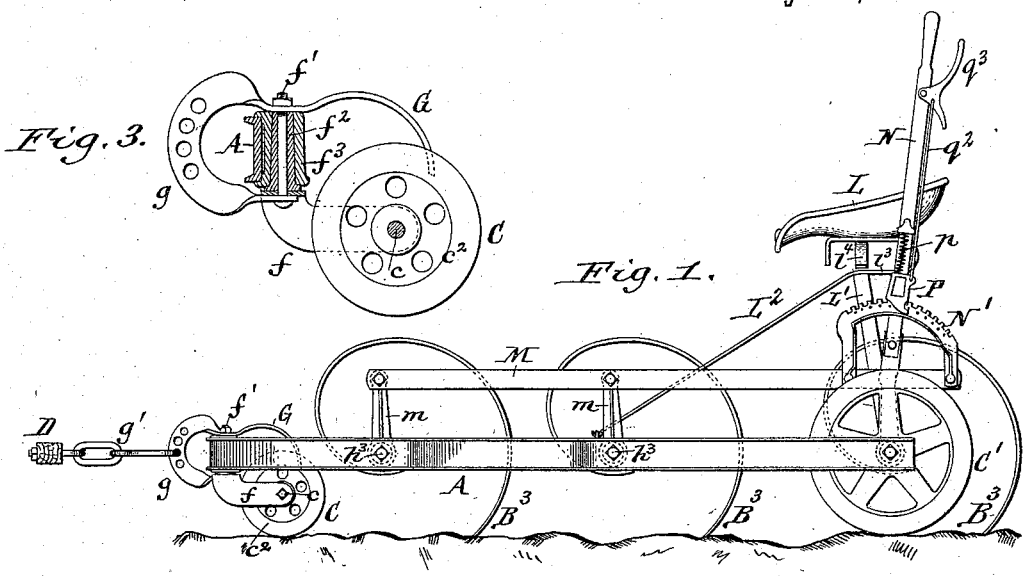
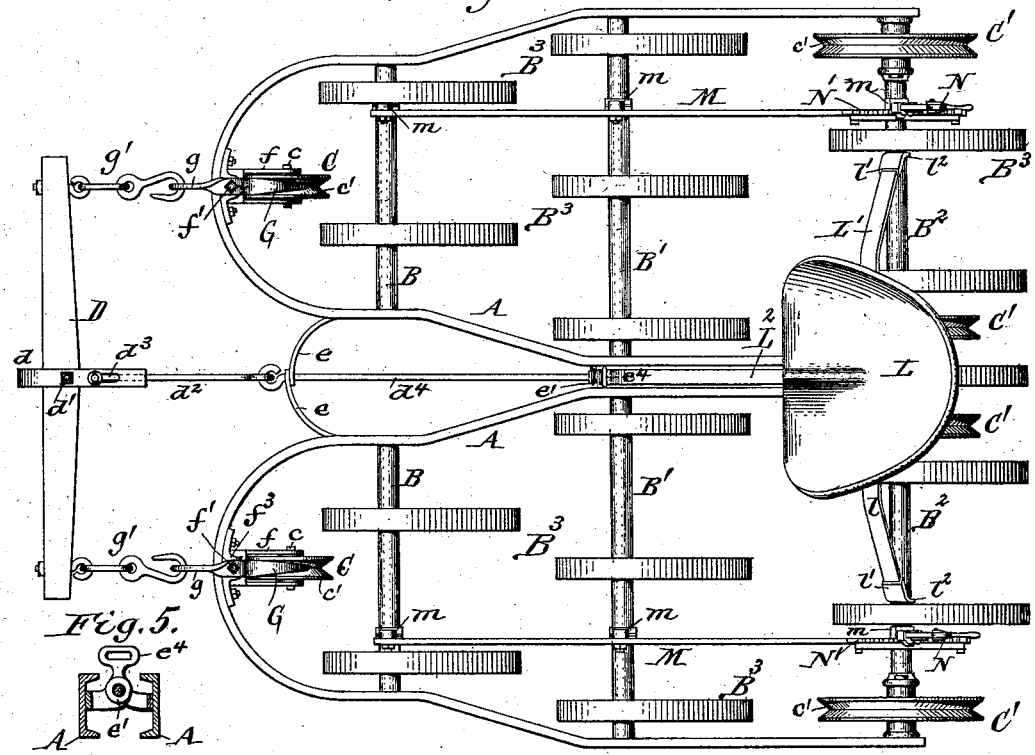
Witnesses:
Ernest Pulford.
Henry L. Deck.
H. J. Case Inventor
By Wilhelm Bonner
Attorneys.

(No Model.)
H. J. CASE.
SPRING TOOTH HARROW.
No. 604,854. Patented May 31, 1898.
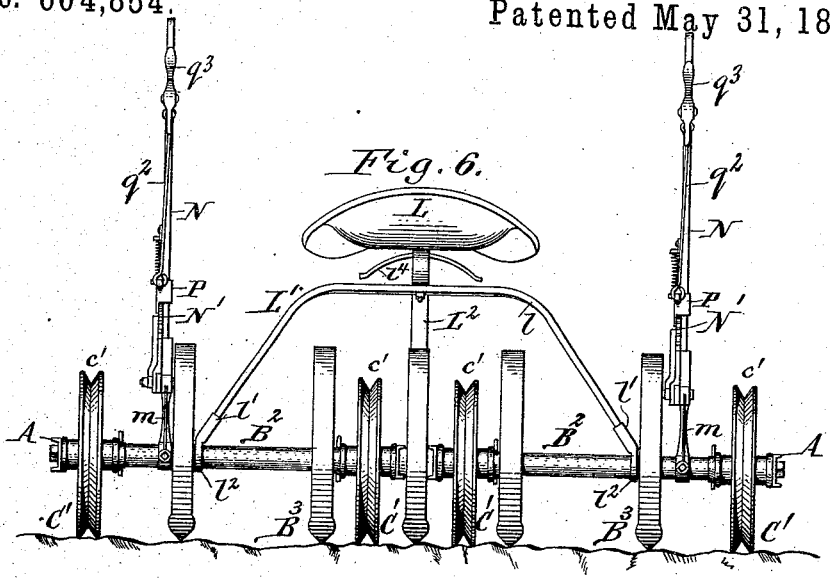
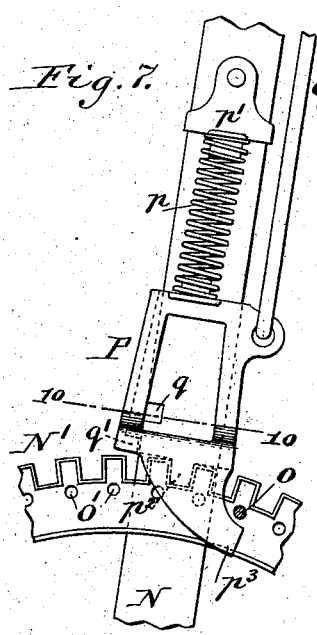
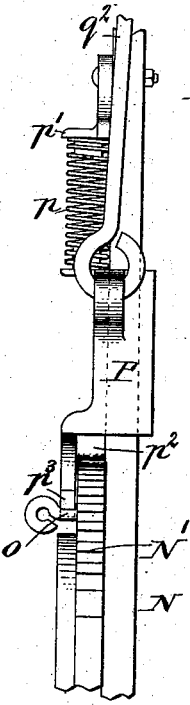
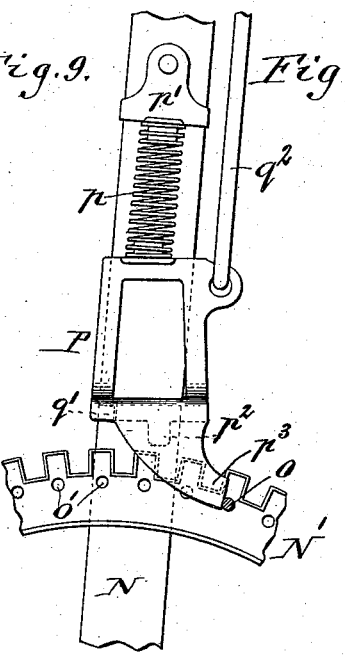
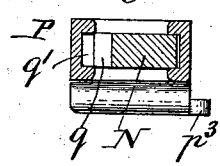
Witnesses:
Ernest Pulsford.
Henry L. Deck.
Henry J. Case, Inventor.
By Wilhelm Bonner,
Attorneys.

(No Model.) 4 Sheets—Sheet 3.
H. J. CASE.
SPRING TOOTH HARROW.
No. 604,854. Patented May 31, 1898.
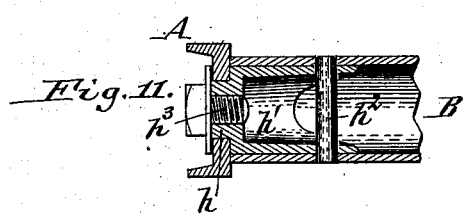
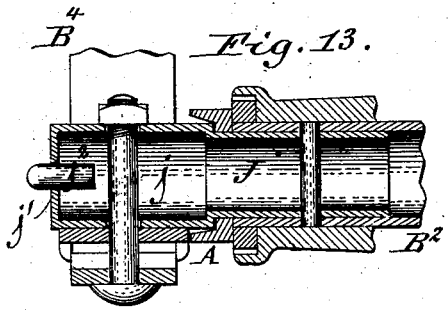
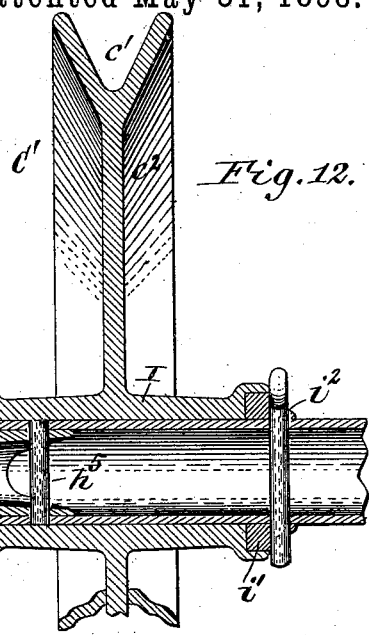
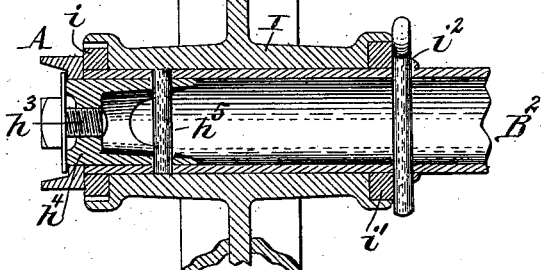
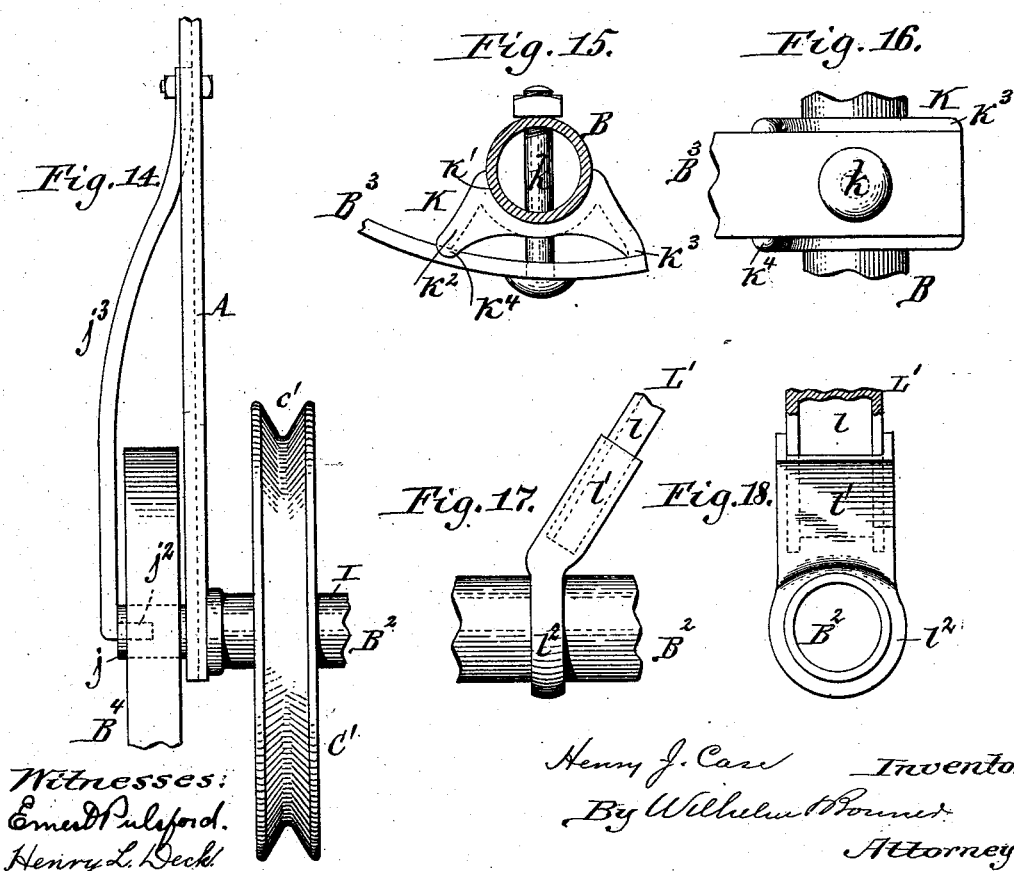
Witnesses:
Ernest Pulsford.
Henry L. Deck.
Henry J. Case Inventor,
By Wilhelm Bonner
Attorneys.

(No Model.) 4 Sheets—Sheet 4.

H. J. CASE.
SPRING TOOTH HARROW.

No. 604,854. Patented May 31, 1898.

Witnesses: Henry J. Case Inventor
Ernest Pulsford. By Wilhelm Bonner
Henry L. Deck. Attorneys

UNITED STATES PATENT OFFICE.

HENRY J. CASE, OF OWASCO, NEW YORK, ASSIGNOR TO THE ADRIANCE, PLATT & COMPANY, OF POUGHKEEPSIE, NEW YORK.

SPRING-TOOTH HARROW.

SPECIFICATION forming part of Letters Patent No. 604,854, dated May 31, 1898.

Application filed February 15, 1897. Serial No. 623,472. (No model.)

*To all whom it may concern:*

Be it known that I, HENRY J. CASE, a citizen of the United States, residing at Owasco, in the county of Cayuga and State of New York, have invented new and useful Improvements in Spring-Tooth Harrows, of which the following is a specification.

This invention has the object to improve the construction and operation of spring-tooth harrows in various respects, which will be hereinafter fully explained.

Figure 19:
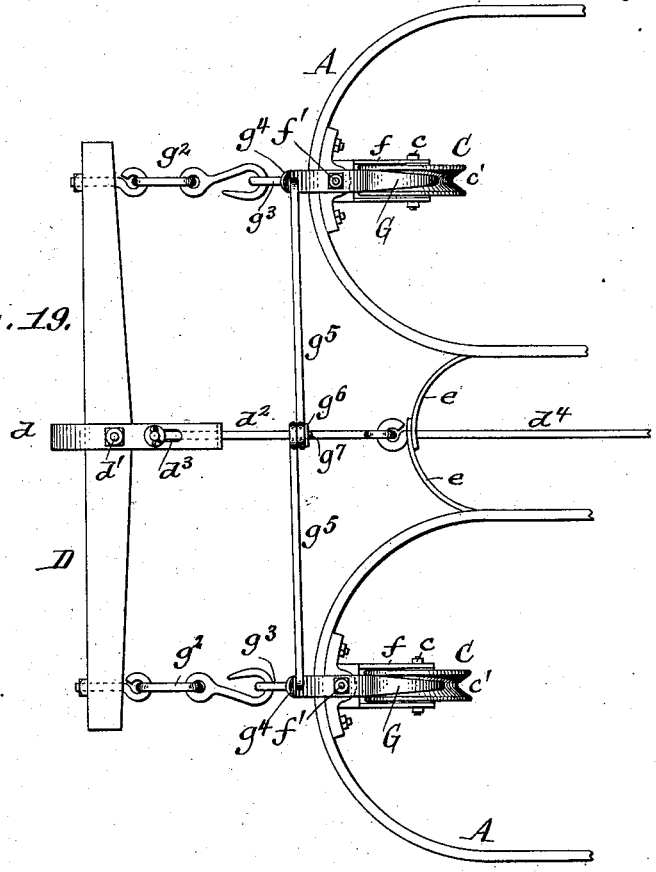
Figure 20:
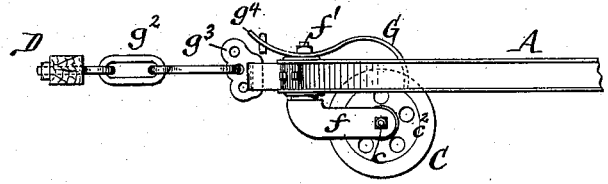
Figure 21:
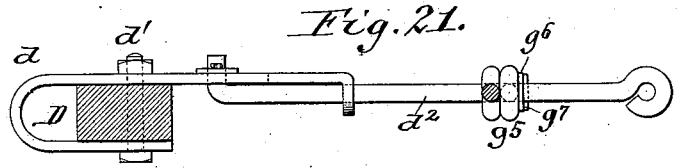

In the accompanying drawings, consisting of four sheets, Figure 1 is a side elevation of a spring-tooth harrow provided with my improvements. Fig. 2 is a top plan view of the same. Fig. 3 is a sectional elevation, on an enlarged scale, of one of the caster-wheels and connecting parts. Fig. 4 is a fragmentary top plan view, on an enlarged scale, of the rear and intermediate hinges which connect the harrow-sections. Fig. 5 is a cross-section in line 5 5, Fig. 4. Fig. 6 is a rear elevation of the harrow. Fig. 7 is a fragmentary side elevation, on an enlarged scale, of the locking devices of the adjusting-lever, showing the latter locked. Fig. 8 is a similar view showing the lever unlocked. Fig. 9 is a rear elevation of the parts in the same position. Fig. 10 is a horizontal section in line 10 10, Fig. 7. Fig. 11 is a vertical section, on an enlarged scale, of the journal of one of the front tooth-bars. Fig. 12 is a similar view of the journal of one of the rear tooth-bars. Fig. 13 is a similar view showing a tooth extension applied to the rear tooth-bar. Fig. 14 is a top plan view of the same tooth extension and connecting parts on a reduced scale. Fig. 15 is a side elevation, partly in section, of the tooth-fastening. Fig. 16 is a bottom plan view thereof. Fig. 17 is a rear elevation of one of the lower ends of the transverse seat-support. Fig. 18 is a side elevation of the same, partly in section. Fig. 19 is a top plan view of the front portion of a harrow provided with a modified construction of the connections between the evener and the scrapers of the caster-wheels. Fig. 20 is a side elevation thereof. Fig. 21 is a sectional side elevation of the central draft-rod and connecting parts.
Like letters of reference refer to like parts in the several figures.

A represents the horizontal frames of the two harrow-sections, arranged side by side and connected by hinges, as usual. Each frame is preferably formed of a channel-bar bent to an elongated forwardly-tapering U form, with the ends of the bar arranged at the rear end of the harrow and the flanges of the channel-bar arranged outwardly.

B represents the front tooth-bar, B' the intermediate tooth-bar, and $B^2$ the rear tooth-bar, journaled transversely in each frame and carrying spring-teeth $B^3$ of any well-known or suitable construction.

C represents a caster-wheel whereby the front end of each harrow-section is supported, and C' two supporting-wheels mounted on each rear tooth-bar $B^2$ for supporting the rear end of each section.

D represents the evener or transverse draft-bar, which is arranged in front of the two harrow-sections and connected with both of them at its middle and at its ends. The middle connection comprises a strap or bent bar $d$, which is secured to the middle of the evener by a vertical bolt $d'$ and extends rearwardly therefrom, and a central draft-rod $d^2$, which has its upturned front end arranged in a longitudinal slot $d^3$ in the rear portion of the strap $d$ and has at its rear end an eye by which it engages with an eye at the front end of a central longitudinal pintle-rod $d^4$, by which the two harrow-sections are connected. This rod serves as a draft-rod and also as a hinge-pin for the two sections and passes for that purpose through the front hinge-arms $e$, the intermediate hinge-sockets $e'$, and the rear hinge-sockets $e^2$, behind which it is provided with a draft-pin $e^3$, Fig. 4. One of the intermediate hinge-sockets is provided on its upper side with a transverse loop $e^4$, Figs. 4 and 5, for the reception of the front brace of the seat.

Each caster-wheel C is mounted in a frame $f$, which extends forwardly and upwardly from the journal $c$ of the wheel and which swivels on a vertical bolt $f'$, Figs. 1, 2, and 3. This frame carries a vertical journal-sleeve $f^2$, which surrounds the bolt $f'$ and turns in a bearing $f^3$, secured to the inner or rear side of the front portion of the harrow-frame. G represents a scraper which is arranged above the wheel and engages with its rear end or point in a V-shaped groove $c'$, formed in the face of the wheel, whereby the groove is kept free from accumulations of earth. The scraper is pivoted on the vertical bolt $f'$, above the bearing $f^3$, and provided in front of the harrow-frame with a clevis $g$, to which the adjacent end of the evener is attached by a link-and-hook connection $g'$. The lower arm of the clevis is pivoted on the bolt $f'$ below the bearing $f^3$. The caster-wheel and the scraper are free to swing together about the axis of the bolt $f'$. When the evener is drawn to one side or the other in changing the direction of movement of the harrow, each clevis is swung to the same side and each scraper to the opposite side, and each scraper compels its caster-wheel to swing with it, whereby the caster-wheels are compelled to follow the movements of the evener. When the caster-wheels are loosely mounted on the bolt $f'$, each wheel is capable of a limited movement about said bolt independent of its scraper, and such oscillations of the wheel bring the sides of the groove in the wheel in close contact with the scraper and assist in keeping the groove clear.

Instead of connecting the scrapers to the ends of the evener they may be connected with the central draft-rod $d^2$, as represented in Figs. 19, 20, and 21. In this construction each end of the evener is connected by a link-and-hook connection $g^2$ with a clevis $g^3$, which is rigidly secured to the front end of the harrow-frame instead of being connected with the scraper, and the scraper is provided in front of the pivot-bolt with an arm $g^4$, which is connected with the central draft-rod $d^2$ by a transverse eyebolt $g^5$. A washer $g^6$ and cotter-pin $g^7$ are arranged on the central draft-rod in rear of the two eyebolts $g^5$. The transverse movement of the evener and the central draft-rod shifts the scrapers correspondingly, and the caster-wheels follow the movements of the scrapers. The rear wheels $C'$ are also formed with V-shaped grooves $c'$ in their faces, and the sides $c^2$ of these wheels, as well as of the caster-wheels, slope or converge inwardly, as shown in Fig. 12, whereby the wheels are better enabled to free themselves of adhering earth and the liability of earth being carried up above the journals is greatly reduced.

The tooth-bars are preferably constructed of iron tubing. The front tooth-bars B and the intermediate tooth-bars B' are journaled in the frames A, preferably by journals $h$, formed on thimbles $h'$, which are secured in the ends of the tooth-bars by pins $h^2$, as shown in Fig. 11. The thimble is larger in diameter than the journal and forms around the journal and within the end of the tooth-bar a shoulder which bears against the inner side of the frame, and the latter is prevented from spreading by screws $h^3$, secured in the journals and bearing with their heads against the outer side of the frame. The rear tooth-bar $B^2$ is also journaled in the frame, but preferably by a journal $h^4$, Fig. 12, which has no shoulder, but extends at its full diameter through the frame-bar. This journal is secured in the end of the tooth-bar by a pin $h^5$, as the journals of the other tooth-bars are secured. The hub I of the rear wheel $C'$ covers this pin. Each end of this hub is provided with an annular recess, which receive, respectively, an outer collar $i$ and an inner collar $i'$, by which the wheel is held in position. The inner collar $i'$ is secured to the tooth-bar by a cotter-pin $i^2$ and the outer collar bears against the inner side of the frame.

When it is desired to increase the width of the area which is operated upon by each harrow-section, a supplementary outer tooth $B^4$ can be attached to the rear tooth-bar on the outside of the outer member of the frame. When this tooth is to be added, the outer rear wheel $C'$ and the outer journal $h^4$ are removed from the rear tooth-bar and a journal J is substituted, Figs. 13 and 14, which has a hollow enlargement or head $j$, which bears against the outer side of the frame, and to which head the extra tooth is secured by the devices hereinafter described or by other suitable means. This head $j$ has in its outer end an opening $j'$, in which engages the inwardly-turned rear end $j^2$ of a brace $j^3$, which is secured with its front end to the outer side of the frame and by which the head is steadied.

The teeth are secured to the tooth-bars preferably by a saddle K and a bolt $k$, Figs. 15 and 16. The saddle K is provided with a concave face $k'$, which fits against the under side of the tooth-bar, and two downwardly-diverging arms $k^2$ $k^3$. The tooth rests against the under sides or faces of these arms, and the front arm $k^2$ is provided with side lips $k^4$, which hold the tooth against lateral displacement. The bolt passes through the tooth, the saddle, and the tooth-bar and draws the tooth firmly against the saddle and the latter against the tooth-bar.

L represents the driver's seat, and L' an arched transverse seat-support which is arranged over the rear tooth-bars $B^2$ of the two harrow-sections and rests with its ends upon said bars. This support is rigid and preferably composed of a bent channel-bar $l$, having its ends removably inserted in the sockets $l'$ of eyepieces $l^2$, which embrace the rear tooth-bars, as shown in Figs. 1, 2, 3, 17, and 18.

$L^2$ is a longitudinal spring-brace which is secured to the middle of the transverse support L' and extends forwardly and downwardly therefrom. The front end of this brace engages in the loop $e^4$ of the intermediate hinge connecting the harrow-sections, Figs. 1, 4, and 5. The upper portion $l^3$ of this spring-brace extends from the point of its attachment to the transverse seat-support L' upwardly and forwardly and carries upon its free upper portion the seat L. This bent spring $l^3$ is formed in one piece with the inclined brace $L^2$ for convenience of construction, but may be made separate therefrom, in which case the brace can be rigid. The seat is provided on its under side with a supplemental transverse spring $l^4$, arranged to bear with its free ends upon the transverse support L' after the spring $l^3$ has been compressed to some extent.

M represents the longitudinal rod by which the three tooth-bars B B' $B^2$ of each harrow-section are connected, so that these bars can be turned simultaneously for adjusting the points of the teeth up and down, and which is attached for that purpose to an arm $m$, projecting upwardly from each tooth-bar.

N is the adjusting-lever, which is secured to and forms an upward continuation of the arm $m$ of the rear tooth-bar $B^2$.

N' is the toothed or notched segment which is secured to the rear portion of the shifting rod M and with which the adjusting-lever is interlocked. In the use of such harrows it happens occasionally that the operator has to raise the teeth for clearing an obstruction. This is done by unlocking the adjusting-lever and moving it forwardly. After the obstruction has been passed it is necessary to return the lever to its former position on the segment in order to return the teeth to the position which they occupied before they were elevated. This is often a matter of considerable difficulty, as the operator cannot well distinguish the particular notch of the segment in which the lever had been locked for giving the teeth the desired penetration. In order to render the return of the lever to its normal position easy and certain, the following devices are employed, which are shown in detail in Figs. 7, 8, 9, and 10:

$o$ represents a releasing-stop which is removably seated in one of a series of openings $o'$ with which each segment N' is provided.

P is a locking-slide which is mounted on the adjusting-lever above the segment and which is pressed down by a spring $p$, arranged on the side of the lever between the top of the slide and an abutment $p'$, secured to the lever. This slide is a frame or casing which embraces the lever, and it is somewhat wider than the width of the lever, so that the lower end of the slide can move laterally on the lever. The slide has a tooth $p^2$, which engages with the segments and which is covered on the front side by a depending curved releasing-arm $p^3$. The lever has a notch $q$ in its front, and the slide has a lip $q'$ on the inner side of its front portion. The arrangement of this lip and notch is such that when the lip engages in the notch the locking-slide is thereby held at such a height on the lever that the tooth of the locking-slide cannot engage in the segment.

$q^2$ represents the rod which connects the rear portion of the locking-slide with the handle $q^3$ at the upper end of the lever.

When the harrow-teeth have been adjusted to the desired depth of penetration, the releasing-pin $o$ is placed in the opening $o'$ which is immediately in rear of and above the lower end of the releasing-arm $p^3$ of the slide, as shown in Fig. 7. In this position of the parts the tooth $p^2$ of the locking-slide engages in one of the notches of the segment and the lip $q'$ of the slide stands below the notch $q$ of the lever. When the operator raises the locking-slide, the releasing-arm of the slide is drawn upwardly past the releasing-pin, sufficient play being provided in the parts for this purpose, the locking-tooth $p^2$ is withdrawn from the segment, and the upward pull which the rod $q^2$ exerts on the rear side of the slide draws the front side of the slide against the front side of the adjusting-lever and the lip $q'$ of the slide into the notch $q$. The slide is thereby locked in its raised position and cannot engage in the segment. The lever can now be moved forwardly as far as may be necessary to clear the obstruction. In moving the lever backwardly for returning the teeth to their operative position the releasing-arm of the slide finally strikes the releasing-stop $o$, as shown in Fig. 8, the openings $o'$ being so arranged on the segment that this stop stands in the path of the releasing-arm when the slide is elevated. The stop arrests the rearward movement of the slide, but the rearward movement of the lever continues, whereby the lip of the slide is moved out of the notch of the lever. The slide now descends and engages with its locking-tooth in the same notch of the segment in which it was engaged before the lever was moved forwardly. By this means the adjusting-lever is automatically returned to that position in which it must be placed for giving the teeth the desired penetration and without the operator being required to give any attention to the adjustment. This enables the operator to move the levers quickly and with the certainty that each set of teeth will be set to the proper penetration and that both sets will be set exactly alike. When the adjustment of the teeth is changed, the position of the releasing-stops on the segments is changed accordingly.

I claim as my invention—

1. The combination with a harrow-frame, of a bracket carrying a caster-wheel and pivoted to said frame, a scraper separately pivoted to swing concentric with the pivot of said bracket and engaging at its rear end with the caster-wheel, and a draft device connected with said scraper, whereby the lateral movement of the draft device is communicated to the scraper and by the latter to the caster-wheel, substantially as set forth.

2. The combination with a harrow-frame, of brackets carrying caster-wheels and pivoted to said frame, scrapers separately pivoted to swing concentric with the pivots of said brackets and engaging at their rear ends with the caster-wheels and provided with arms in front of their pivots, and a transverse draft-bar arranged in front of the harrow-frame and connected at its ends with the front arms of said scrapers, substantially as set forth.

3. The combination with a harrow-frame, of grooved caster-wheels pivoted to said frame, scrapers pivoted concentric with the pivots of said caster-wheels and engaging with their rear ends in the grooves of said wheels, clevises secured to said scrapers and arranged in front of the pivots thereof, and a draft-bar having its ends connected with said clevises, substantially as set forth.

4. The combination with a harrow-frame having a journal-opening, of a hollow tooth-bar bearing against the inner side of said frame, a journal secured in said bar, a screw secured in the outer end of said journal and bearing with its head against the outer side of said frame, a supporting-wheel mounted upon said bar and having its hub provided with annular recesses in its ends, a collar seated in the outer recess and bearing against the inner side of the frame, and a collar seated in the inner recess and secured to the tooth-bar, substantially as set forth.

5. The combination with a harrow-frame having a journal-opening, of a hollow tooth-bar bearing against the inner side of said frame, a journal secured in said bar and provided outside of said frame with an enlargement which bears against the outer side of said frame, a tooth secured to said enlargement, and a brace secured at its front end to the frame and engaging at its rear end with said enlargement, substantially as set forth.

6. The combination with the adjusting-lever and its segment, of a locking-slide mounted on said lever, means whereby said slide can be locked on the lever in an elevated position to clear the segment, and releasing devices whereby the slide is automatically released from the lever to interlock with the segment, substantially as set forth.

7. The combination with the adjusting-lever and its segment, of a locking-slide mounted on said lever and provided with a releasing-arm, means whereby said slide can be locked on the lever in an elevated position to clear the segment, and a releasing-stop on the segment which is adapted to engage with the arm of the slide and release the latter from the lever, substantially as set forth.

8. The combination with the adjusting-lever and its segment, of a locking-slide mounted on the lever and provided with a lip which is adapted to engage in a notch in the lever for locking the slide in an elevated position, and having a releasing-arm, of a releasing-stop on the segment which is adapted to engage with the arm of the slide and release the lip of the latter from the notch in the lever, substantially as set forth.

Witness my hand this 9th day of February, 1897.

HENRY J. CASE.

Witnesses:
WM. A. ADRIANCE,
TUNIS ACKERMAN.